(12) United States Patent
Singletary

(10) Patent No.: US 6,276,087 B1
(45) Date of Patent: Aug. 21, 2001

(54) PORTABLE FIREARM SUPPORT DEVICE

(76) Inventor: John Singletary, 381 M$^c$ Garrah Rd., Ochlocknee, GA (US) 31773

( * ) Notice: Subject to any disclaimer, the term of this patent is extended or adjusted under 35 U.S.C. 154(b) by 0 days.

(21) Appl. No.: 09/200,531

(22) Filed: Nov. 27, 1998

Related U.S. Application Data

(63) Continuation-in-part of application No. 08/939,532, filed on Sep. 29, 1997, now abandoned.

(51) Int. Cl.$^7$ ................................................ F41A 27/06
(52) U.S. Cl. .................................................... 42/94
(58) Field of Search ....................... 42/94; 89/37.04; 248/118, 118.3, 118.5

(56) References Cited

U.S. PATENT DOCUMENTS

| | | | | |
|---|---|---|---|---|
| 1,337,359 | * | 4/1920 | Johnston | 89/37.04 |
| 2,847,909 | * | 8/1958 | Kester | 89/37.04 |
| 3,225,656 | * | 12/1965 | Flaherty et al. | 42/94 |
| 4,844,390 | * | 7/1989 | Duke | 42/94 |
| 4,913,391 | * | 4/1990 | Klipp | 42/94 |
| 5,287,643 | | 2/1994 | Arizpe-Gilmore | 42/94 |
| 5,414,949 | * | 5/1995 | Peebles | 42/94 |
| 5,481,817 | | 1/1996 | Parker | 248/286.1 |
| 5,553,717 | * | 9/1996 | Minneman et al. | 42/94 |
| 5,979,099 | * | 11/1999 | Kervin | 42/94 |

\* cited by examiner

Primary Examiner—Michael J. Carone
Assistant Examiner—Denise J Buckley

(57) ABSTRACT

The present invention is a support comprising a first portion and a second portion. The first portion is T-shape and includes a hollow shaft perpendicularly secured to a support member. The support member will receive the item which is to be stabilized, such as a firearm or camera. The second portion is removably affixed to the first portion and includes an elongated rod. This second portion includes a first end and a second end. The first end is received in the hollow shaft and the second end includes a clamping device to allow the device to be secured to a desirable surface. The height of the device can be adjusted via an adjusting mechanism.

13 Claims, 4 Drawing Sheets

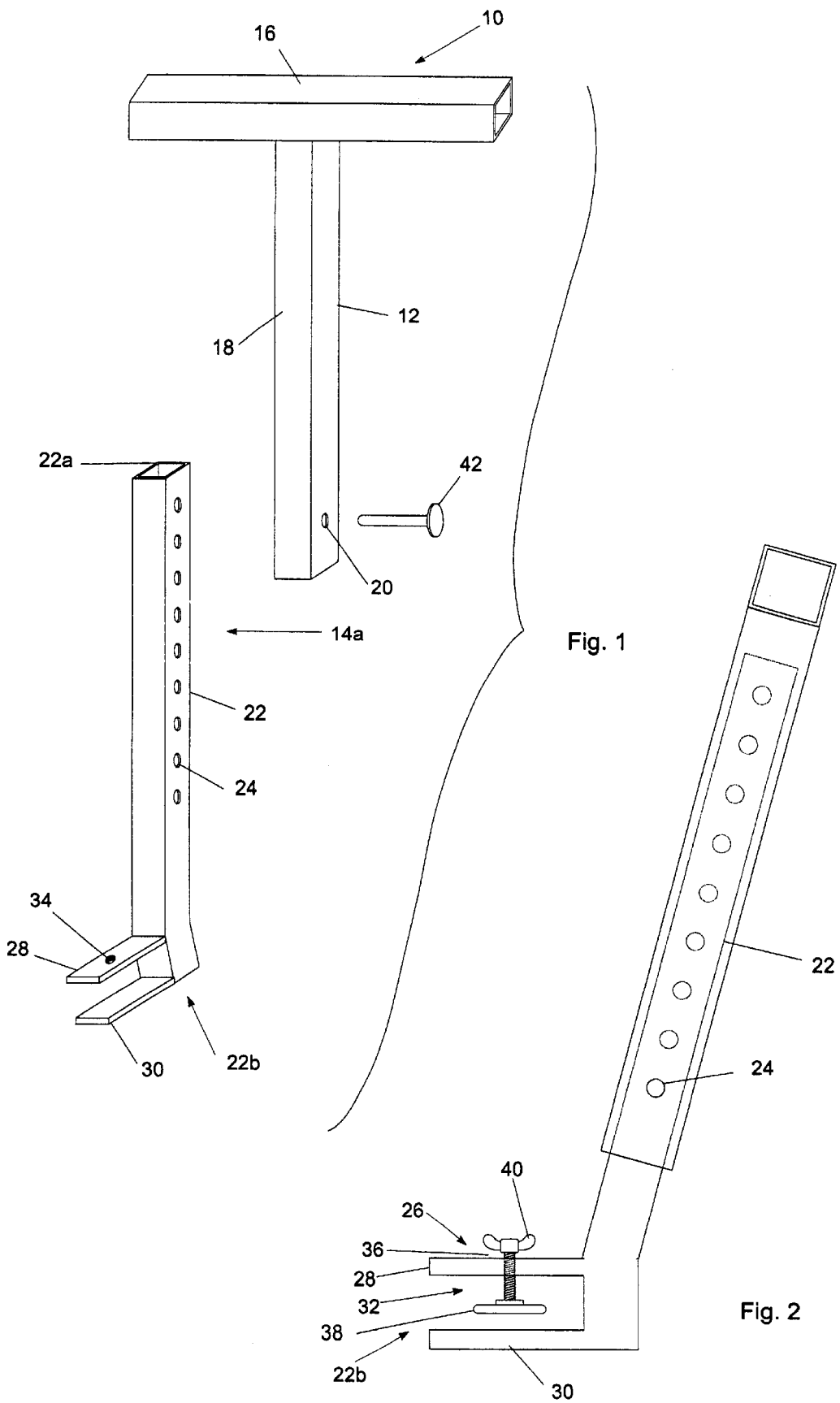

PORTABLE FIREARM SUPPORT DEVICE

This is a Continuation-In-Part of application Ser. No. 08/939,532, filed Sep. 29, 1997 now abandoned.

BACKGROUND OF THE INVENTION

1. Field of the Invention

The present invention relates generally to a firearm support device and more particularly to a portable and adjustable firearm support device which will offer support to the user's arm for rendering steadiness which will allow a successful discharge of the firearm.

2. Description of the Prior Art

Stabilizing devices, for use with firearms, have been employed successfully for many years. These conventional stabilizing devices are utilized by many for a multitude of reasons. For example, sportsmen may use device for resting their firearm, while biologists, environmentalists, and animal lovers will used the stabilizer for stabilizing their arm or camera for properly photographing the observed animal(s).

These stabilizers come in a variety of forms and configurations, each having a particular function and design. In U.S. Pat. No. 5,481,817 issued to Parker there is disclosed a firearm support used solely for the sportsman. This device includes a telescopic stand which is clampable to a support, such as a seat, and a substantially horizontally disposed tube, pivotally and rotatably secured to the stand. The tube further includes an armrest movably attached to one end of the tube and a gun cradle movable attached to the opposite end thereof. Though this device may be well suited for hunting, this stabilizer is limiting and can be considered cumbersome. The use of both the arm rest and gun cradle can be obstructive if the device is used other than for a firearm stabilizer. Additionally, the use of numerous removable components provides a device with additional elements. This increase in elements inherently provides for an increase in component lose and/or failure. Such a lost or failure will consequently render the device useless. Further, the device requires a numerous amount of adjustments to be made prior to its utilization. These numerous adjustments can be burdensome and difficult, especially for those with limited dexterity, or the like. In addition, once the desired position of the armrest and gun cradle are locked reposition of the gun is virtually impossible. Thereby, if the hunted prey moves, the hunter cannot smoothly move his firearm, since the gun cradle and armrest will be in the way. Accordingly, rendering the stabilizer useless.

Yet another device is disclosed in U.S. Pat. No. 5,287,643 issued to Arizpe-Gilmore. This device is a stabilizer combined with a hunting seat. The stabilizer is cup-shaped, thereby providing a device which can only be used with a gun, and which cannot be used with a camera or the like. Additionally, the use of the chair provides a device which is bulky and difficult to transport, especially during a hunting expedition. Further, the chair does not allow the user to utilize the device in a conventional portable platform, since many convention hunting platforms do not offer the adequate stability and surface area for a chair.

Accordingly, it is seen that none of these previous efforts provide the benefits intended with the present invention, such as provide a stabilizer which is versatile, light weight and easily transportable. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a stabilizing apparatus that is portable and adjustable. This stabilizing apparatus will act as a resting means for the user's arms in order to offer stability while aiming a firearm, camera, video, or the like.

The stabilizing apparatus of the present invention comprises an upper portion removably secured to a lower portion. The upper portion includes a T-shape configuration having a support bar perpendicularly attached to a shaft. The shaft includes a conventional attaching device.

The lower portion includes different embodiments, which are suited for different environments and usage. The first embodiment will enable the stabilizing apparatus to be removably secured to any particular elevated stationary surface, such as, but not limited to, a hunting stand, chair, or the like. The second embodiment enables the device to be used on a flat and planar surface, one that is not elevated, such as, but not limited to, the ground.

In the first embodiment for the lower portion, a rod is provided. This rod includes a first end and a second end. A conventional adjusting attaching device is located on the rod. This conventional adjusting attaching device is engagable to the attaching device located on the shaft. The first end is removably secured to the upper portion and the second end includes an adjustable clamp. This clamp provides for the device to be removably secured to any particular stationary surface, such as, but not limited to, a hunting stand, chair, or the like.

In the second embodiment for the lower portion, the shape will be a conventional tri-pod configuration. This will allow for the user to easily and quickly place the device on a flat planar surface. The use of a tri-pod will offer stability and flexibility to the user.

In yet another configuration, the lower portion will be a harness which straps around the user's shoulders and waist. Centrally located in the front of the harness is a receiving apparatus for receiving and maintaining the upper portion of the stabilizing apparatus. This receiving apparatus is angularly disposed, with respect to the user, so as to provide for the upper portion to be located away from the user. The receiving apparatus includes a securing mechanism for securing the top portion to the receiving apparatus.

The upper and lower portion, in any of the above described embodiments, can include any shape, such as a rectangular shape or a circular shape. In the preferred embodiment, the upper and lower portions will have an overall circular configuration. In this arrangement, the user can easily rotate the stabilizer to any desired location. This will enable the device to pivot and thus will include a locking mechanism for locking the desired pivoted located in a fixed and secured position.

Thereby, the user can purchase the upper portion separately from each lower portions. The lower portion can be purchased as to the needs and desires of the user, thereby offering more versatility, flexibility and usability of the final product.

Accordingly, it is the object of the present invention to provide for a stabilizing device that will overcome the deficiencies, shortcomings, and drawbacks of prior stabilizing devices and methods thereof.

Another object of the present invention is to provide for a stabilizing device that is versatile and can be used in a plurality of fields, such as, but not limited to photography, hunting, filming, or the like.

Still a further object of the present invention is to provide for a support device that can be assembled and disassembled quickly, easily and efficiently.

Yet another object of the present invention, to be specifically enumerated herein, is to provide a stabilizing device in accordance with the preceding objects and which will conform to conventional forms of manufacture, be of simple construction and easy to use so as to provide a device that would be economically feasible, long lasting and relatively trouble free in operation.

Although there have been many inventions related to a stabilizing devices, none of the inventions have become sufficiently compact, light weight, versatile, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

FIG. 1 is an exploded perspective view of the support device of the present invention.

FIG. 2 is a side view of the support device of the present invention.

Similar reference numerals refer to similar parts throughout the several views of the drawings.

DESCRIPTION OF THE PREFERRED EMBODIMENTS

The present invention is a support device 10 that is adapted to be removably secured to any type of object, regardless of its location and overall shape. The ultimate use of the support device 10 is used to support the user's arms, which will inherently offer stability while utilizing and operating any particular conventional implement with the user's hand, such as a firearm, camera, or the like. Thereby providing for the support device to be used as a prop for offering adequate support when stability is a necessity and a desire.

With reference to drawings, and in particular to FIGS. 1 and 2 thereof, the support device 10 of the present invention will be described. As seen, the device 10 comprises an upper section 12 and a first embodiment for the lower section 14a.

Figure 3A:
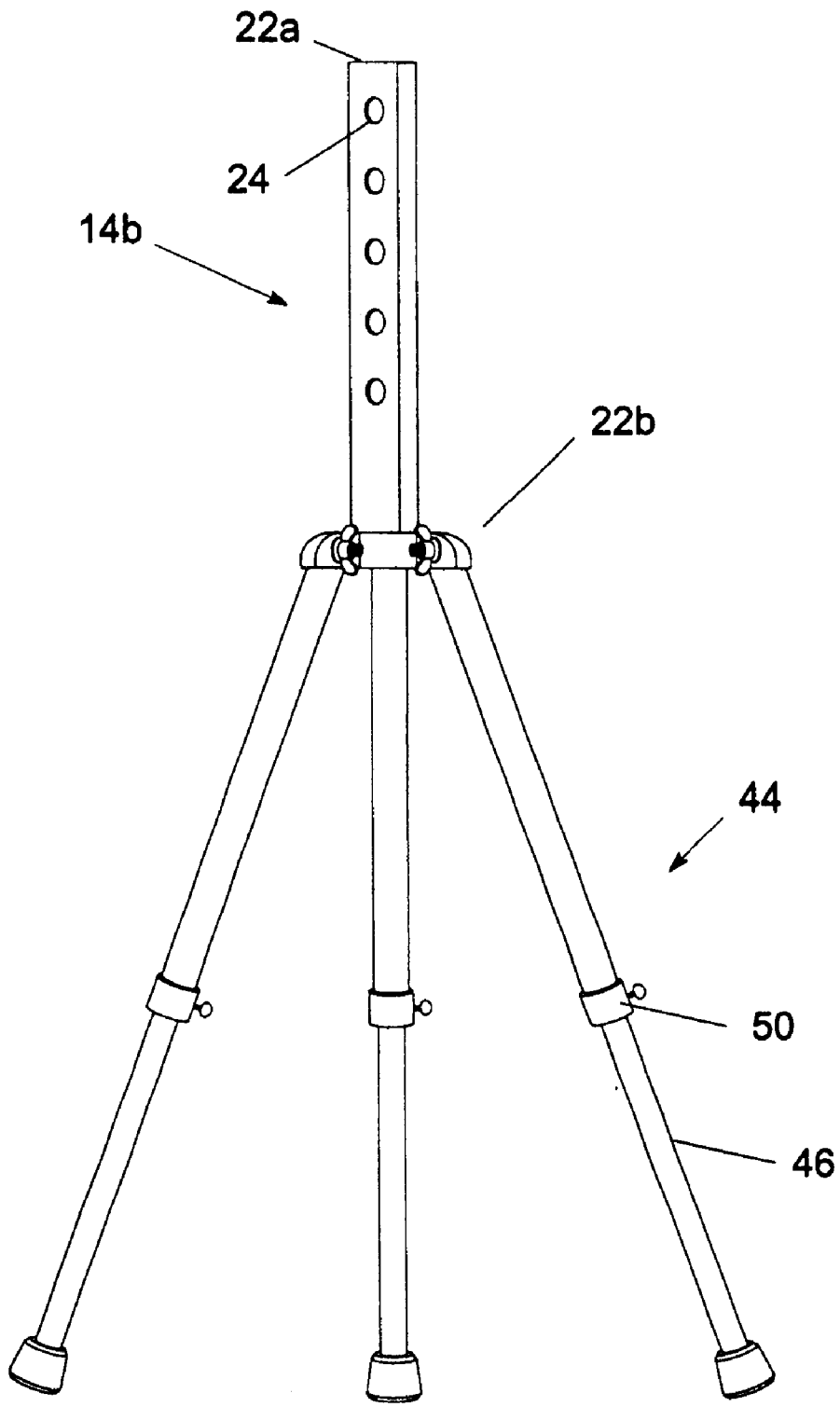
FIG. 3a is a perspective view of an alternative embodiment for the lower portion that can be used with the support device of the present invention.
Figure 3B:
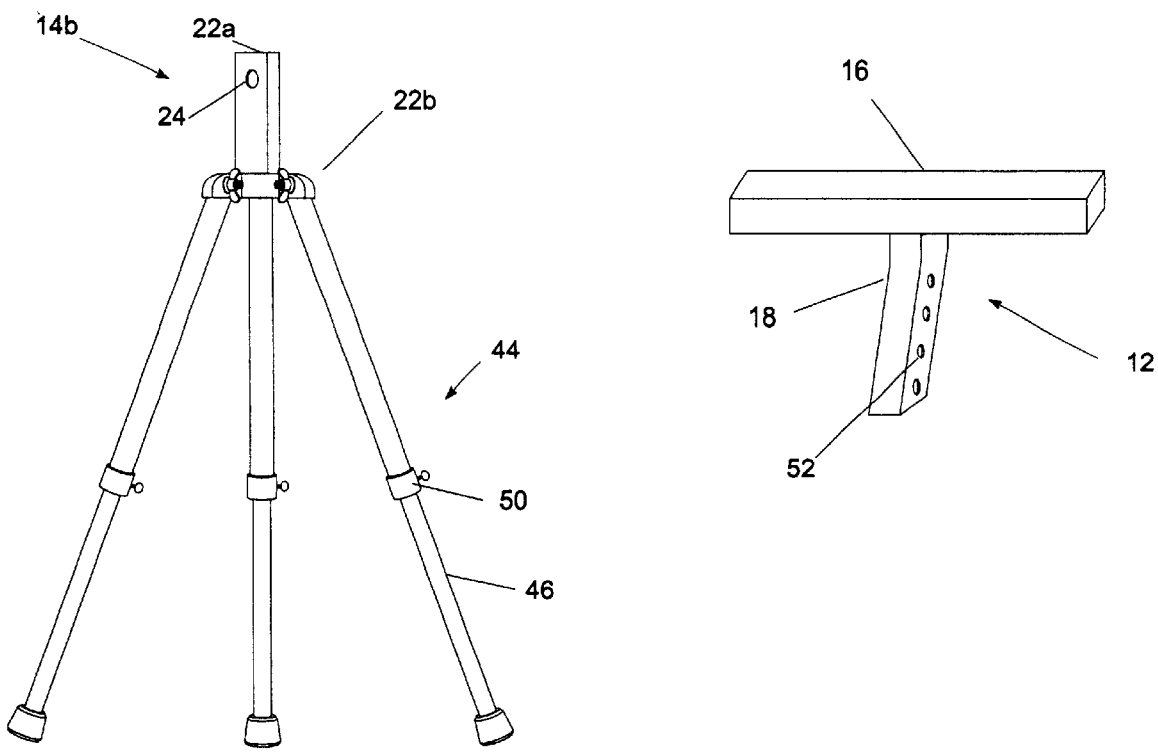
FIG. 3b is a perspective view of an alternative embodiment for the support device of the present invention.

The upper section is generally T-shaped in configuration and includes a top support member 16 which is perpendicularly secured to a hollow shaft 18. The top support member 16 will act as a prop. Thereby, the top support member 16 will receive and maintain the item that is to be supported, such as a firearm, camera, user's arms, or the like. If the top shaft is hollow, as illustrated, ends cap can be provided on the open ends for covering and protecting the user from the edge of the opening. The end caps are conventional elements and are mainly used as a safety measure so as to protect the user from harm and injury. Alternatively, this top shaft can include ends which are not opened as illustrated in FIGS. 3b and 4c.

As seen in FIGS. 1 and 2, the hollow shaft includes a top end and a lower end. The top end is secured to the top support member 16 while the lower end will receive the lower portion. Extending through the hollow shaft 18 is an aperture 20. This aperture 20 acts as the attaching device that will removably secure the first embodiment of the lower section 14a to the top section 12.

The first embodiment of the lower section 14 includes a rod 22 having a first end 22a and a second end 22b. The first end is the upper end and will be received within the hollow shaft 18 of the upper portion 12. The second end includes the removably attaching device 26 (illustrated in FIG. 2). This removably attaching device 26 allows the device to be removably secured to any stable and elevated surface.

A corresponding attaching device 24, for corresponding with attaching device 20 extends through the shaft. In these figures the corresponding attaching device 24 comprises a plurality of the apertures, which can be evenly spaced. Hence, in operation, the top end 22a is inserted and received within the opened end lower of the top portion 12. Once the desired height is achieved, hole 20 is aligned with an aperture 24. A locking device, or the like is inserted into the desired hole. Thereby, locking the device in a stable and workable position.

The removable attaching device 26 is a clamp and is located on the second end of the shaft. This removable attaching device includes an upper wall 28 and a lower wall 30. A gap 32 is located between the upper and lower walls. This gap will receive the particular surface for securement. A tightening device 36 will contact the particle surface for allowing the attaching device to be secured thereto.

The tightening device 36 extends through the top wall 28 via a threaded opening 34 (illustrated and labeled in FIG. 1). This tightening means, as seen in FIG. 2, includes a lower portion and an upper portion. Located on the lower portion is a plate 38 while a handle 40 is located on the upper portion. The tightening device is rotated for moving the plate vertically. The use of a threaded rod and threaded opening provides for a controlled alteration. This vertical movement will alter the distance between the plate 38 and the lower wall 30 allowing the acceptance of any object, regardless of its girth and width.

For utilizing the first embodiment of the present invention, the lower portion 14a of the device 10 is secured to the desired elevated surface, such as, but not limited to a deer stand, ladder, seat, or the like, via the removably attaching device 26. The plate is moved upward, for allowing the gap 32 to easily receive the desired surface. Once located therein, the handle 40 is rotated. The plate 36 moves downward and towards the desired surface. The contact between the desired surface and the plate provides for the lower portion to be secured to the desired surface.

The next step is to adjust the device to the desired height. In order to do so, the lower portion 14 is inserted into the hollow shaft 18 of the first portion 12. Once the desired height is obtained, a locking pin 42, or the like is inserted into the aligned hole of the rod 22 and the aperture 20 of the hollow shaft of the upper portion. This will lock the upper portion to the lower portion.

While holding the desired item, such as the firearm, camera, or the like, the user places it on the support member 16. Optionally, the user's hand can be propped on this support member 16 while holding the item.

It is noted that the hollow shaft 18 and rod 22 can be displaced at an acute angle with respect the to desired surface. This angular disposition, as illustrated, provides for a more natural propping means for the device of the present invention.

Alternatively, the removable attaching device 26 can be replaced with a conventional tripod stand. This alternative embodiment for the lower section 14b is illustrated in further detail in FIG. 3a. As seen in this drawing, the lower section 14b includes an upper end 22a and a lower end 22b. The upper end is substantially the same shape, structure and configuration as the upper end the first embodiment illustrated in FIGS. 1 and 2. Hence, as seen, the upper end of the lower section 14b includes an attaching device 24, which, as illustrated are a plurality of apertures. The attaching device 24 corresponds to the aperture located in the lower end of the upper section. Thereby, providing for the top end 22a of the lower section 14b to receive the hollow shaft 18 of the upper section 12. The top section is secured to the lower section via the attaching device (apertures 20 and 24, repetitively) and locking pin 42.

The lower end includes a conventional tripod 44. The legs can be permanently affixed to the upper end 22a to provide for the conventional tripod 44 to be in a fixed position. Hence, in this configuration, the user can choose which lower section he wishes to utilize, either the clamp or the telescopic legs.

Alternatively, and as illustrated, the legs on the tripod 44 can be telescopic 46. This tripod design is conventional and as seen provides for the legs to be secured to the main body via pivot means (illustrated, but not labeled). This pivot means is a conventional pivot means widely used with tripods. As seen, this pivot means includes threaded rods and wing nuts, which when loosen will enable the legs to move to the desired angle. Once the desired angle is achieved, the legs are locked in a fixed position via the wing nut.

The structure and shape of the tripod 44 as well as the method of providing telescopic legs 46 is conventional and well known in the art. As seen in the drawings, the telescopic legs are secured via a conventional securing apparatus 50. Accordingly, the lower portion of the legs are able to extend downward (or upward) by way of unlocking the securing apparatus, which is illustrated in this figure as a threaded rod. The legs can extend upward or downward, until the desired height is achieved. Once the desired height is achieved, the user locks the legs in a fixed position via the securing apparatus 50.

The use of collapsible (telescopic) and foldable legs are one common and conventional feature which enhances the tripod. The collapsibility available with the tripod configuration provides for a final product that is compact and that can enable adequate and convenient travel.

The use of a tripod provide a final product that includes a prop that can be used on any flat surface. In the tripod design, the user can easily and efficiently place the stand on the ground, which is generally desirable when hunting or photographing a particular type of animal, such as turkeys.

In an alternative arrangement, as illustrated in FIG. 3b, the hollow shaft 18 of the upper section 12 and the rod of the lower section 14b can be shortened considerably so as to provide for a few or even just one aperture 24 to constitute the attaching device for the lower section. Adjusting in height can occur via the legs 46 of the tripod 44. In this arrangement, the legs would be telescopic, and thus allow for the user to adjust the length via the legs.

The top portion 12 of the present invention can be altered as well as seen in FIG. 3b. As seen the hollow shaft 18 would include a plurality of apertures 52. Thereby, the user could leave the tripod legs stationary and enable alteration of height to occur via the top portion 12.

Alternative, a harness can be used for the lower portion. This harness is illustrated in further detail in FIG. 4a. As seen, the support device comprises a upper section 12 (illustrated in FIG. 4c) and a lower section 14. The upper section is similar in design and structure as discussed above, except that in this embodiment the upper section is received in the lower section. This will provide for the upper section to be located in the lower section.

In order to enable this type of configuration, the upper section, as seem in FIG. 4c, comprising the support member 16 and hollow shaft 18, as discussed in the previous embodiments. Extending through the hollow shaft 18 are a plurality of apertures 52.

Figure 4A:
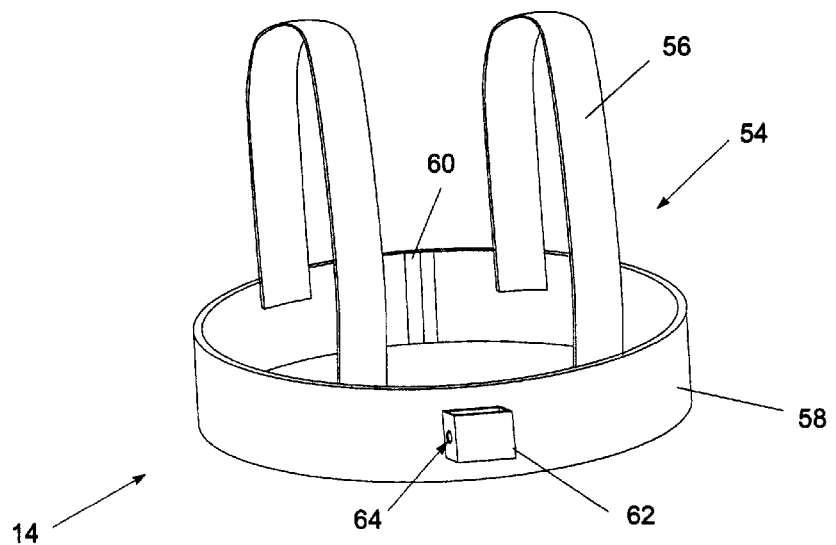
FIGS. 4A–4C is a perspective view of another embodiment for the lower portion that can be used with the support device of the present invention.

The lower section 14, as seen in FIG. 4a, is a harness 54 having shoulder straps 56 connected to a waist strap 58. A conventional snap or buckle 60 is located at the back or side of the waist strap 58. Hence in this arrangement, the user wraps the harness around his waist, inherently causing the straps to be located over his shoulder. Once in place, the user snaps or buckles the rear or side of the waist strap to a locked and fixed position.

The snap is conventional and can be a belt-buckle like configuration. This will allow for the waist portion to be adjustable. The lower surface of the strap can include padding for added comfort.

Located at the front of the waist is the receiving member 62 for receiving and maintaining the upper section of the support device of the present invention. As seen in the drawings, this receiving member 62 is a hollow cup having an aperture 64 extending therethrough. This aperture 64 corresponds to the apertures 52 located within the hollow shaft 18. Accordingly, to utilize this embodiment, the user places the hollow shaft 18 within the receiving member 62. Once the desired height is obtain, the apertures are aligned, and a pin or the like is inserted into the aligned apertures for locking the upper section in a fixed position.

For providing a comfortable fit, the receiving member is angularly disposed. This will provide for the hollow shaft to extend slightly away from the user. Thereby, providing for the receiving member to be at an acute angle with respect to the front surface of the waist portion 58 of the harness 54.

Figure 4B:
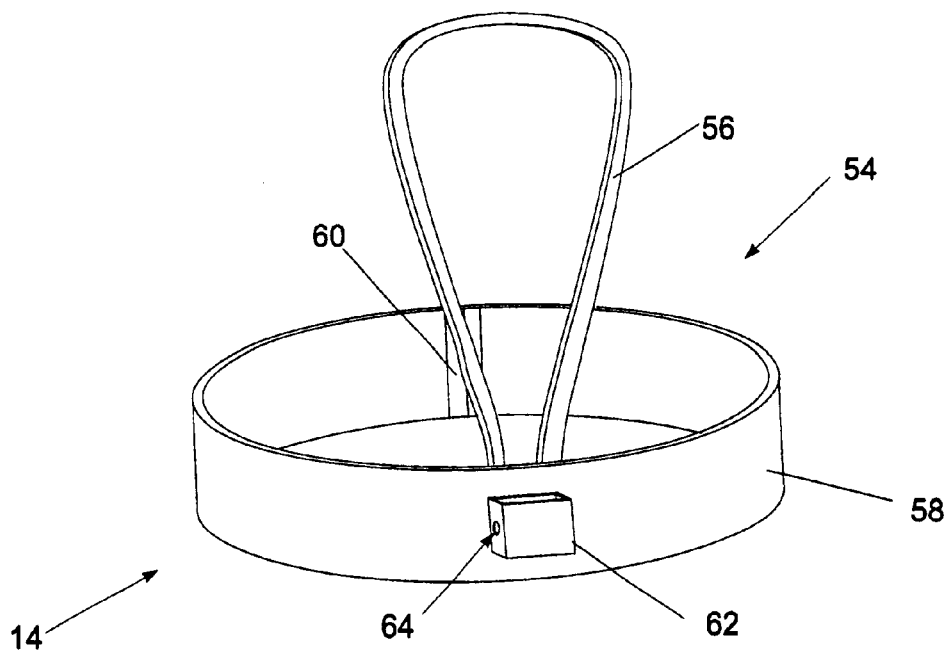
Figure 4C:
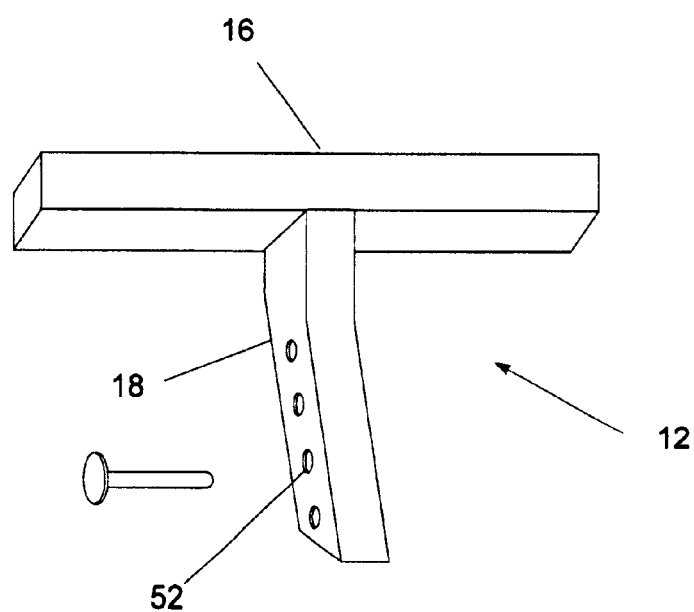

This harness can be altered slightly, as illustrated in FIG. 4b. As seen in this drawing the strap 56 is designed to wrap around the user's neck. This will enable the final product to be secured to the user quickly and easily.

The upper and lower portions, in any of the above described embodiments, can include any shape, such as a rectangular shape or a circular shape. In a preferred embodiment the upper and lower portions will have an overall circular configuration. In this arrangement, the user can easily rotate the stabilizer to any desired location. This will enable the device to pivot and rotate freely, as desired by the user.

In order to rotate the device, the user does not insert the pin into opening 20, but rather into one of the desired apertures 24 of the attaching means. This will provide for the top portion to rest on the pin and enable pivotal movement. For transporting the device, the pin would be inserted into holes 20 and 24, respectively, for locking the device in a position for adequate travel.

While the invention has been particularly shown and described with reference to an embodiment thereof, it will be understood by those skilled in the art that various changes in form and detail may be made without departing from the spirit and scope of the invention.

I claim:

1. A gun rest support comprising:
   an upper section removably secured to a lower section;
   said upper section is substantially a hollow T-shape having a support member and a hollow shaft;
   said support member is substantially flat and planar and free of obstructions;
   said support member is perpendicularly and permanently affixed to said hollow shaft for providing said upper section to be an integral unit;
   said lower section includes an elongated rod having a first end and a second end;
   said second end receives said hollow shaft to provide for said hollow shaft to slide over said elongated rod;
   a height adjusting device is located on said hollow shaft and said elongated rod, said height adjusting device allows said support member to be raised or lowered; and
   a clamping device having an upper wall and a lower wall is located on said second end, and a tightening device rotatably extends through said upper wall towards said lower wall for allowing said clamping device to be removably secured to a surface.

2. A support as in claim 1 wherein said height adjusting device includes an aperture located in said upper section and a plurality of apertures located in said lower section, a pin is removably inserted into said aperture and said plurality of apertures when aligned.

3. A support as in claim 1 wherein said support member includes outer ends and end caps are secured to each said outer end.

4. A support as in claim 1 wherein said elongated rod is attached to said clamping device angularly to provide for said upper section to extend outward from a user.

5. A support as in claim 1 wherein said elongated rod and said clamping device form an integral structure.

6. A gun rest support comprising:
   an upper section removably secured to a lower section;
   said upper section is substantially a hollow T-shape having a support member and a hollow shaft;
   said support member is substantially flat and planar and free of obstructions;
   said support member is perpendicularly and permanently affixed to said hollow shaft for providing said upper section to be an integral unit;
   said lower section includes an upper portion for receiving said hollow shaft and a lower portion;
   said lower portion includes a tripod configuration having a plurality of legs;
   said plurality of legs is pivotally secured to said tripod;
   a height adjusting device is located on said plurality of legs of said tripod, said height adjusting device allows said support member to be raised or lowered.

7. A support as in claim 6 wherein said support member includes outer ends and end caps are secured to each said outer end.

8. A support as in claim 6 wherein said upper portion is attached to said tripod angularly to provide for said upper section to extend outward from a user.

9. A support as in claim 6 wherein said tripod is collapsible.

10. A gun rest support comprising:
    an upper section removably secured to a lower section;
    said upper section is substantially a hollow T-shape having a support member and a hollow shaft;
    said support member is substantially flat and planar and free of obstructions;
    said support member is perpendicularly and permanently affixed to said hollow shaft for providing said upper section to be an integral unit;
    said lower section includes a receiving member for receiving said hollow shaft;
    a belt is secured to said receiving member and said belt includes a buckle for enabling attachment to a user; and
    said receiving member includes a height adjusting device for adjusting the height of said hollow shaft to said receiving member.

11. A support as in claim 10 wherein a pair of shoulder straps is secured to said belt.

12. A support as in claim 10 wherein a neck strap is secured to said belt.

13. A support as in claim 10 wherein said receiving member is attached to said belt angularly to provide for said upper section to extend outward from a user.

* * * * *